(12) United States Patent
Levey et al.

(10) Patent No.: US 7,549,443 B2
(45) Date of Patent: Jun. 23, 2009

(54) FUEL SHUT-OFF VALVE ASSEMBLY WITH ASSOCIATED COMPONENTS AND METHODS OF MAKING AND ASSEMBLING THE SAME

(75) Inventors: Kenneth R. Levey, West Chicago, IL (US); Eric G. Parker, Winnetka, IL (US); Kirk J. Bush, Holland, MI (US); Franco A. Cisternino, Deerfield, IL (US)

(73) Assignee: Illinois Tool Works Inc., Glenview, IL (US)

( * ) Notice: Subject to any disclaimer, the term of this patent is extended or adjusted under 35 U.S.C. 154(b) by 436 days.

(21) Appl. No.: 10/976,709

(22) Filed: Oct. 29, 2004

(65) Prior Publication Data

US 2005/0121085 A1  Jun. 9, 2005

Related U.S. Application Data

(60) Provisional application No. 60/528,037, filed on Dec. 9, 2003, provisional application No. 60/557,182, filed on Mar. 29, 2004, provisional application No. 60/582,380, filed on Jun. 23, 2004.

(51) Int. Cl.
*F17D 1/00* (2006.01)
(52) U.S. Cl. .................... 137/592; 141/326; 220/86.2
(58) Field of Classification Search ............... 137/590, 137/592, 588; 141/286, 326; 220/86.2
See application file for complete search history.

(56) References Cited

U.S. PATENT DOCUMENTS

| | | | | |
|---|---|---|---|---|
| 3,730,216 A | * | 5/1973 | Arnett et al. | 137/588 |
| 4,715,509 A | * | 12/1987 | Ito et al. | 220/86.2 |
| 4,747,508 A | * | 5/1988 | Sherwood | 220/86.2 |
| 4,893,643 A | | 1/1990 | Gifford et al. | 137/202 |
| 4,924,923 A | | 5/1990 | Boehmer et al. | 141/312 |
| 4,944,779 A | * | 7/1990 | Szlaga et al. | 96/109 |
| 4,946,060 A | * | 8/1990 | Sherwood et al. | 220/86.2 |
| 4,966,299 A | * | 10/1990 | Teets et al. | 220/746 |
| 4,986,439 A | * | 1/1991 | Ott et al. | 220/830 |
| 5,022,433 A | * | 6/1991 | Jansky et al. | 137/588 |
| 5,027,868 A | * | 7/1991 | Morris et al. | 141/59 |
| 5,071,018 A | * | 12/1991 | Moore | 220/86.2 |

(Continued)

FOREIGN PATENT DOCUMENTS

DE   197 46 231   5/1998

(Continued)

OTHER PUBLICATIONS

International Search Report and Written Opinion for PCT/US2008/058105.

*Primary Examiner*—John Rivell
*Assistant Examiner*—Andrew J Rost
(74) *Attorney, Agent, or Firm*—Mark W. Croll; Paul F. Donovan

(57) ABSTRACT

A shut-off valve assembly includes a one-piece housing having an inlet and an outlet. During manufacture, the housing is formed with an inlet end plate and a fully open end opposite the end plate. A valve door assembly including a flapper door is secured in the housing, and includes a seal between the flapper door and the housing. The open end is then reformed to provide an outlet from the housing. In a fuel system, a cover assembly is releasably secured to the housing.

15 Claims, 9 Drawing Sheets

U.S. PATENT DOCUMENTS

| | | | |
|---|---|---|---|
| 5,103,877 A * | 4/1992 | Sherwood et al. | 137/588 |
| 5,186,220 A * | 2/1993 | Scharrer | 141/59 |
| 5,195,566 A * | 3/1993 | Ott et al. | 141/312 |
| 5,282,497 A | 2/1994 | Allison | 141/59 |
| 5,322,100 A | 6/1994 | Buechler et al. | 141/312 |
| 5,431,199 A | 7/1995 | Benjay et al. | |
| 5,730,194 A * | 3/1998 | Foltz | 137/588 |
| 5,732,840 A * | 3/1998 | Foltz | 141/348 |
| 5,735,322 A | 4/1998 | Palvolgyi | 141/386 |
| 6,009,920 A * | 1/2000 | Palvoelgyi et al. | 141/348 |
| 6,029,719 A * | 2/2000 | Hor et al. | 141/348 |
| 6,044,864 A * | 4/2000 | Maier | 137/588 |
| 6,230,739 B1 * | 5/2001 | Gericke | 137/588 |
| 6,330,893 B1 | 12/2001 | O'Connell | |
| 6,338,362 B1 | 1/2002 | Gabbey et al. | 137/588 |
| 6,408,903 B1 | 6/2002 | Theuer et al. | |
| 6,415,813 B1 | 7/2002 | Kraft | 137/409 |
| 6,415,827 B1 | 7/2002 | Harris et al. | |
| 6,539,990 B1 | 4/2003 | Levey et al. | |
| 6,685,043 B1 | 2/2004 | Long, Sr. | |
| 6,755,057 B2 * | 6/2004 | Foltz | 141/312 |
| 6,789,586 B2 | 9/2004 | Levey | |
| 6,983,773 B1 | 1/2006 | Hagano et al. | |
| D537,398 S | 2/2007 | Levey et al. | |
| 2002/0083997 A1 | 7/2002 | O'Connell | |
| 2002/0088801 A1 | 7/2002 | Temmesfeld | |
| 2003/0089424 A1 | 5/2003 | Gabbey et al. | 141/286 |
| 2005/0121085 A1 | 6/2005 | Levey et al. | |
| 2008/0029157 A1 | 2/2008 | Levey et al. | |

FOREIGN PATENT DOCUMENTS

| | | |
|---|---|---|
| DE | 102 10 513 | 10/2003 |
| EP | 0 248 673 | 12/1987 |
| EP | 0872370 A | 10/1998 |
| FR | 2588806 A | 4/1987 |
| FR | 2710721 A | 4/1995 |
| JP | 08025984 | 1/1996 |
| JP | 2001 150963 | 6/2001 |
| JP | 2003 306048 | 10/2003 |
| WO | WO 97/13648 | 4/1997 |

\* cited by examiner

FUEL SHUT-OFF VALVE ASSEMBLY WITH ASSOCIATED COMPONENTS AND METHODS OF MAKING AND ASSEMBLING THE SAME

CROSS-REFERENCE TO RELATED APPLICATIONS

This application claims the benefits of U.S. Provisional Application Ser. No. 60/528,037 filed Dec. 9, 2003; U.S. Provisional Application Ser. No. 60/557,182 filed Mar. 29, 2004 and U.S. Provisional Application Ser. No. 60/582,380 filed Jun. 23, 2004.

FIELD OF THE INVENTION

The present invention relates to fuel systems for motor vehicles, and, more specifically to primary fuel shut-off valve assemblies in capless refueling systems and the methods of making and assembling the same.

BACKGROUND OF THE INVENTION

Fuel systems for motor vehicles are known to include a fuel tank and a filler tube through which fuel is dispensed into the tank. It is known to use a removable cap at the end of the filler tube to close the tube. The threaded fuel cap is the primary seal for the fuel system on most domestic vehicles. For the threaded cap to seal the fuel system properly, the cap must be twisted on correctly. If a fuel cap is not properly tightened, is missing or is defective, a significant amount of fuel can be released to the atmosphere through evaporation from the fuel tank.

It is known to use a movable damper and a rubber seal to close the fuel system, either as the primary shut-off valve or as a secondary, supplemental shut-off. A known assembly of this type includes a metal tube or sleeve and a plastic insert or cover adapted to be received within the sleeve. An annular groove is provided on the outer surface of the plastic insert, and a rubber seal or the like is positioned within the groove between the inner surface of the metal sleeve and the outer surface of the plastic insert. Properly functioning, an assembly of this type can be effective in minimizing the loss of fuel from the fuel system. However, through age, fatigue and deterioration of the seal and associated components, the sealed area between the insert and the outer sleeve provides a path for the leakage of vapors from the tank. Even a small leak can result in significant loss of fuel and environmental pollution.

It also is known to use a positive sealing insert in the end of the filler tube and a capless refueling closure unit at the end of the filler tube. Known capless refueling systems are complex and costly. Assembly of such a system is difficult and time consuming. Disassembly for repair, integrity or crash worthiness and overall sealing effectiveness have not achieved acceptability in many such systems.

Vehicle crash worthiness standards require that the fuel system structural integrity remain in the event of a crash. This includes integrity of the tank, the filler tube and a closure therefore, so that fuel does not leak and create a fire danger. This can present challenges in attaching end closure assemblies since the fuel tank is often connected to the vehicle frame and the filler tube extends through or near to outer fender bodies that may be significantly damaged during a crash. A closure for the filler tube, and thus a closure for the fuel tank, must maintain its integrity and effectiveness even if outer portions of the filler tube are damaged extensively along with the body panels through which the tube extends.

What is needed in the art is a vehicle fuel system filler assembly that includes an effective shut-off valve assembly with reduced area of potential leakage together with an outer closure therefore that can be assembled quickly and easily, yet separates for crash worthiness or needed repairs.

SUMMARY OF THE INVENTION

The present invention provides a fuel shut-off valve, including a one-piece outer housing having an inlet thereto for a fuel supply nozzle and having no other open area requiring sealing. The shut-off valve assembly mates with an outer closure therefore in a snap-fit assembly that can be connected easily, disassembled for repair and separates in the event of a crash to maintain the filler tube closure.

In one aspect thereof, the present invention provides a fuel shut-off valve assembly with a one-piece housing defining an outlet for attachment to a fuel system and an inlet defining an opening for receiving a fuel filler nozzle therein. A flapper door in the housing is movable with respect to the housing for opening and closing the inlet. A seal is disposed between the flapper door and the inlet. A biasing means urges the door to a closed position compressing the seal.

In another aspect thereof, the present invention provides a method of manufacturing a primary fuel system shut-off valve assembly with steps of forming a housing having a more open end and a more closed end defining a limited diameter nozzle inlet opening to the housing; inserting a valve door assembly into the housing through the more open end of the housing; and reforming at least a portion of the housing adjacent the more open end to reduce a diameter thereof and create an outlet from the housing for attachment to an automobile fuel system.

In a still further aspect thereof, the present invention provides a method for assembling a capless refueling system, with steps of providing a fuel system shut-off valve assembly including a housing with an inlet, a flapper door for closing the inlet, a seal between the flapper door and the housing, and a ring; securing a base to the housing by engaging deflectable tabs over the ring; interdigitating tabs of a cover with the tabs of the base; and positioning a ring over the interdigitated tabs for securing the relative positions of the interdigitated tabs and locking the cover assembly to the base.

In yet another aspect thereof, the present invention provides a manufacturing apparatus for a primary fuel system shut-off valve assembly for an automobile with means for forming a housing having a substantially cylindrical wall with a more open end and a more closed end defining a limited diameter nozzle inlet opening to the housing; means for inserting a valve door assembly into the housing through the more open end of the housing; and means for reforming at least a portion of the housing to reduce a diameter thereof and create an outlet from the housing for attachment to an automobile fuel system.

An advantage of the present invention is providing a fuel system shut-off valve assembly with a one-piece outer housing having only a limited access therethrough for a fuel filler nozzle, with no other opening, thereby providing only a small area requiring sealing for closing the fuel system.

A further advantage of the present invention is providing a fuel shut-off valve assembly that relieves unequalized pressure conditions between the tank interior and ambient.

A further advantage of the present invention is providing a fuel system shut-off valve assembly with an outer closure assembly that is easily and quickly assembled.

Yet another advantage of the present invention is providing a fuel shut-off valve assembly that closes securely when refueling is complete.

A still further advantage of the present invention is providing a fuel shut-off valve assembly that maintains sealing integrity during a vehicle crash event.

Other features and advantages of the invention will become apparent to those skilled in the art upon review of the following detailed description, claims and drawings in which like numerals are used to designate like features.

Figure 1:
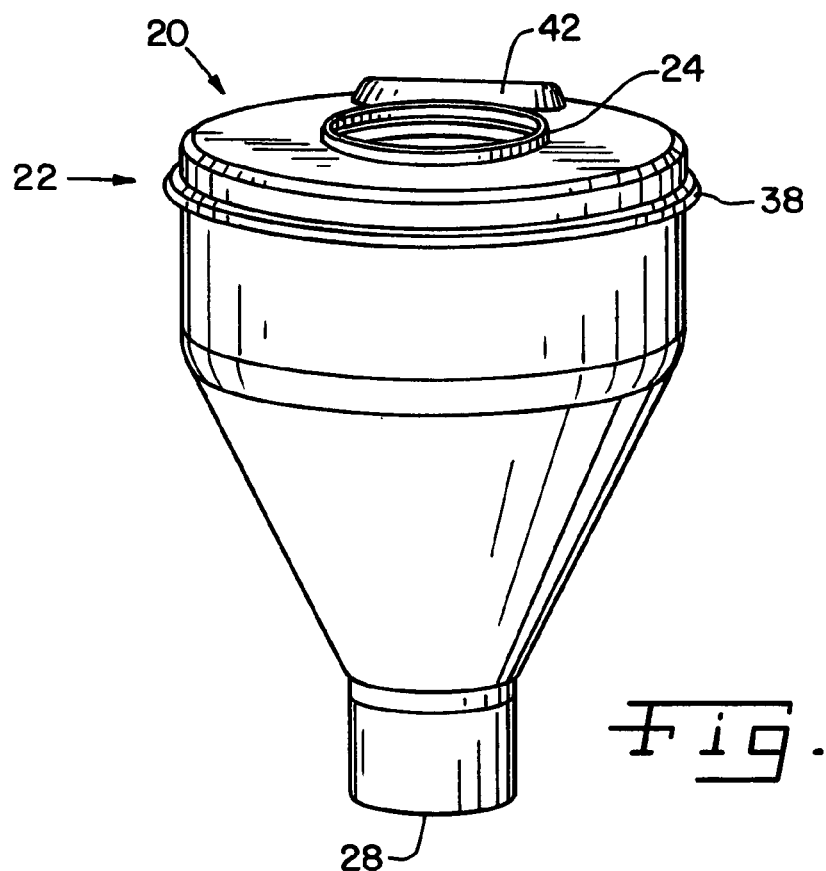
FIG. 1 is a perspective view of a fuel shut-off valve assembly in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
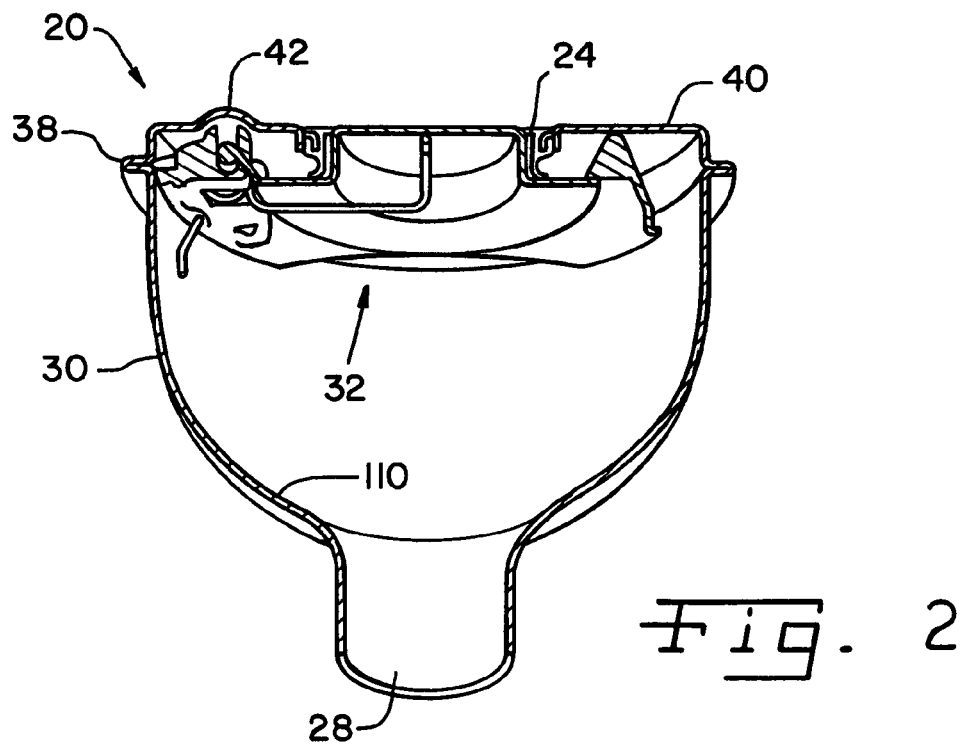
FIG. 2 is a cross-sectional view of the fuel shut-off valve assembly shown in FIG. 1.
Figure 3:
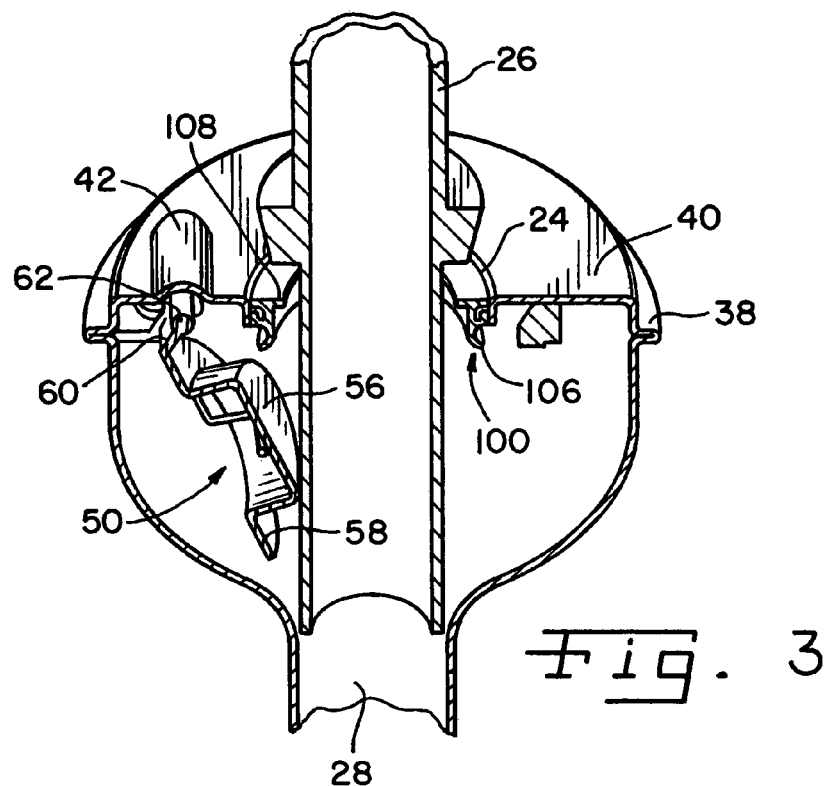
FIG. 3 is a cross-sectional view similar to that of FIG. 2, but illustrating a fuel nozzle inserted through the fuel shut-off valve assembly.
Figure 4:
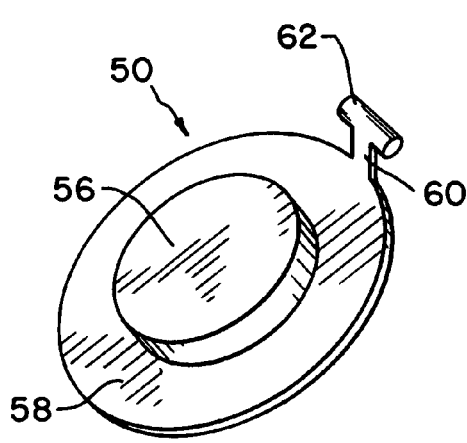
FIG. 4 is a perspective view of the valve door of the present invention.
Figure 6:
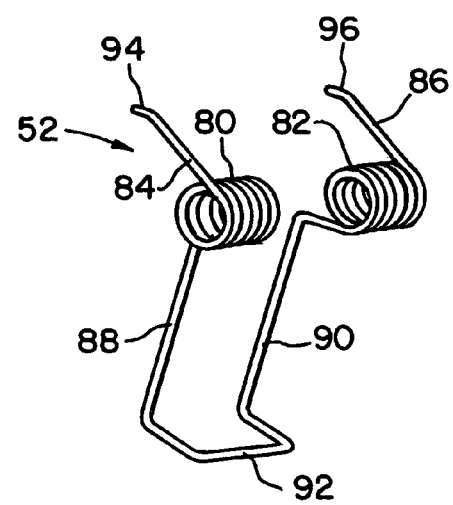
FIG. 6 is a perspective view of the biasing spring of the valve assembly.
Figure 5:
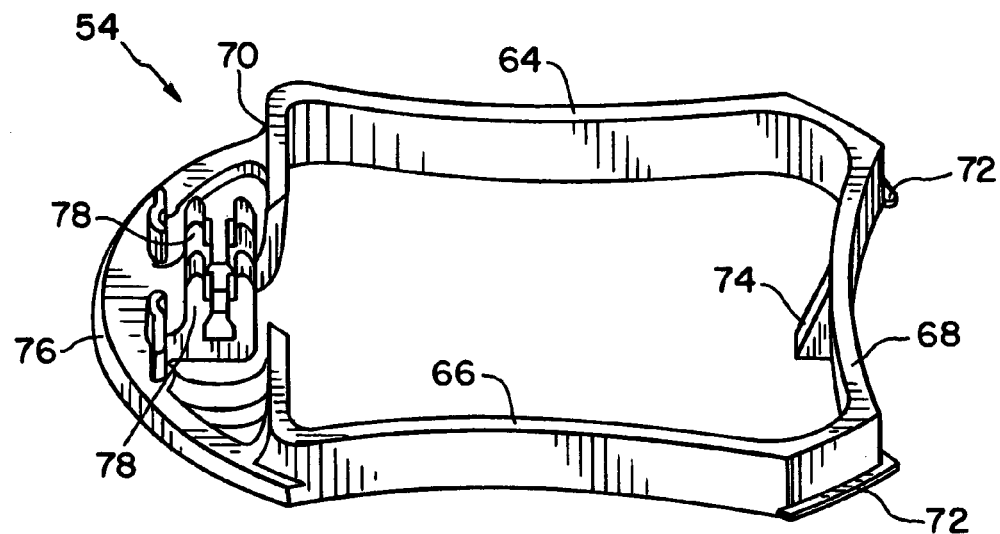
FIG. 5 is a perspective view of a carrier used in the valve assembly of the present invention.

Referring now more specifically to the drawings and to FIG. 1 in particular, numeral 20 designates a primary fuel shut-off valve assembly in accordance with the present invention. Valve assembly 20 includes an inlet end 22 having an annular inlet 24 defining a hole through which a fuel filler nozzle 26 (FIG. 3) of a fuel dispensing system is inserted for refueling a vehicle on which valve assembly 20 is installed. An outlet 28 from valve assembly 20 is provided opposite inlet end 22. As illustrated more clearly in FIG. 2, fuel shut-off valve assembly 20 includes a housing 30 in which inlet 24 and outlet 28 are defined. A valve door assembly 32 is provided for closing inlet 24, except when nozzle 26 is inserted therethrough.

Figure 8:
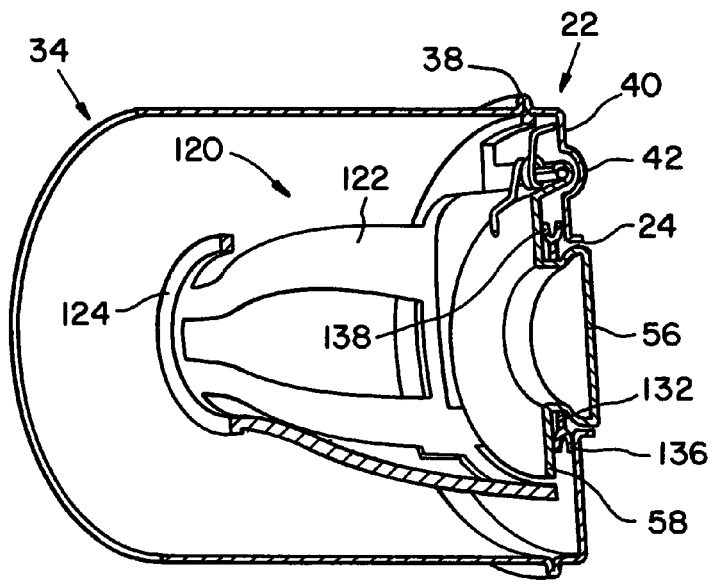
FIG. 8 is a cross-sectional view of an alternate form of the present invention during a first step of manufacture.
Figure 9:
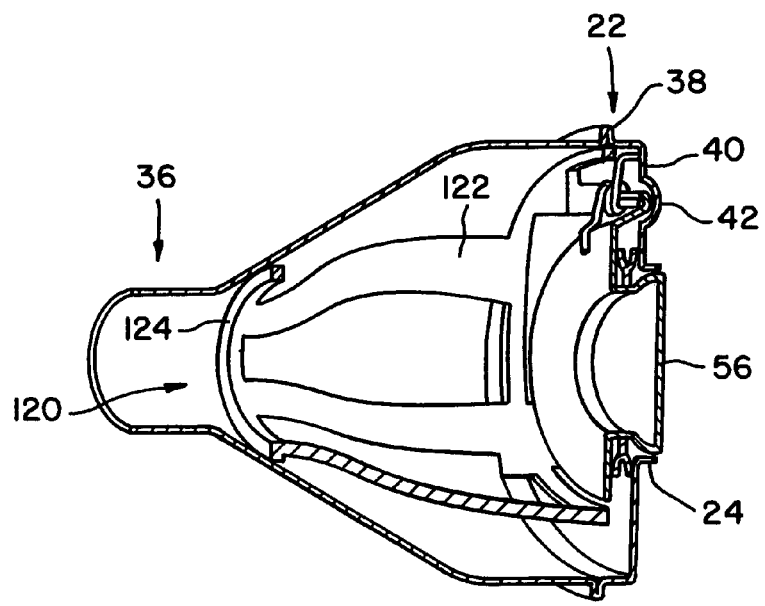
FIG. 9 is a cross-sectional view similar to that of FIG. 8, but illustrating a subsequent step during the manufacture of the present invention.

Housing 30 is a one-piece structure that can be made of any suitable material, such as, for example, stainless steel, carbon steel, cold roll steel or aluminum. Housing 30 can be formed by stamping or other similar technique, and is first formed with substantially closed and finished inlet end 22 and a substantially open outlet end 34, as shown in FIG. 8, substantially open outlet end configuration 34 being required for assembly. Valve door assembly 32 is inserted into housing 30 through substantially open outlet end configuration 34 and is secured in housing 30 at inlet end 22. Thereafter, outlet end configuration 34 is reformed to define a finished outlet end 36 having outlet 28 therein (FIG. 9). Outlet end 36 is attached to a fuel system filler pipe (not shown) by suitable means, such as, for example, welding, adhesive or the like.

Suitable process for reforming open outlet end 34 to finished outlet end 36 include multiple coning operations in a press and spin forming. During the initial forming and reforming processes, stresses are induced into housing 30. To reduce the likelihood of stress induced cracking, all or portions of housing 30 can be annealed. Localized induction annealing can be used on only that portion of housing 30 that is being reformed. Multiple annealing steps can be used as the initial shaping and reforming occur.

In the exemplary embodiment shown in the drawings, housing 30 includes a radially outwardly extending outer ring 38 formed by pinching or the like. Housing 30 includes a substantially closed end plate 40 in which inlet 24 is defined. A dimple or enlargement 42 is provided in end plate 40. Internally of housing 30, ring 38 and enlargement 42 define a channel 44 and cavity 46, respectively, for the securement and operation of valve door assembly 32, as will be described in greater detail hereinafter.

Valve door assembly 32 includes a flapper door 50, a biasing element 52 and a carrier 54. Carrier 54 is secured in housing 30, and flapper door 50 and biasing element 52 are connected to and supported by carrier 54 for operation with respect to outlet 28.

Flapper door 50 is hat-like in shape and includes a cupped central portion 56 for projecting through inlet 24 and a peripheral flange 58 about central portion 56. Near the outer edge of flange 58, a hinge arm 60 and a rolled pin hinge element 62 are provided, with pin 62 transverse to arm 60 at the distal end of arm 60. Central portion 56 is of a size and shape to project into inlet 24 from the inside of housing 30. As shown in FIG. 1, inlet 24 defines a ridge from the external surface of end plate 40 that stands proud of central portion 56, to protect central portion 56 from inadvertent opening during a crash or other event.

Carrier 54 is a frame-like structure having opposed sides 64, 66 and opposed ends 68, 70 between opposed sides 64, 66. One or more edge element 72 is configured and arranged to be received in channel 44 for securing carrier 54 within housing 30. In the exemplary embodiment shown in the drawings, two edge elements 72 are shown one each substantially at the corner junctions between sides 64, 66 and end 68. End 68 further defines an abutment 74 as a stop for movement of flapper door 50 with respect to carrier 54.

End 70 of carrier 54 is configured for pivotally holding flapper door 50 and biasing element 52 in operative positions, as will be described more fully hereinafter. End 70 is substantially arch-shaped, having an apex area 76 that is also configured and arranged to be received in channel 44 for the positioning and securement of carrier 54 within housing 30. One or more Clamping arm 78 projects outwardly from end 70 in a substantially axially direction with respect to housing 30 of the assembled valve assembly 20. In the exemplary embodiment shown in the drawings, two clamping arms 78 are provided. Cavity 46 defines a space for receiving the distal ends of clamping arms 78 and thus orients and positions carrier 54 relative to housing 30. Clamping arms 78 receive and retain hinge pin 62 of flapper door 50, thus allowing pivotal movement of flapper door 50 about an axis defined by pin 62.

Biasing element 52 is a double torsion spring sized to provide appropriate torque on flapper door 50 for sealing engagement of flapper door 50 relative to inlet 24. Biasing element 52 includes helical spring portions 80, 82 each having an individual arm 84, 86 extending therefrom. Legs 88, 90 from spring portions 80, 82, respectively, are interconnected by a common foot element 92. In the assembled valve assembly 20, foot 92 is disposed against central portion 56 substantially at the center thereof such that spring force is applied to the center of flapper door 50 for even load distribution on flapper door 50. Biasing element 52 thereby provides a consistent, equal seal force between flapper door 50 and inlet 24 throughout the seal area. Distal end segments 94, 96 of arms 84, 86, respectively, are disposed against housing 30 in the assembled valve assembly 20. Biasing element 52 thereby functions as a grounding path through valve assembly 20 between flapper door 50 and housing 30 so that a static electric charge conveyed through nozzle 26 to flapper door 50 during a refueling operation can be conducted to ground through valve assembly 20. The risk of fuel vapor ignition from a static electric discharge is reduced.

Figure 7:
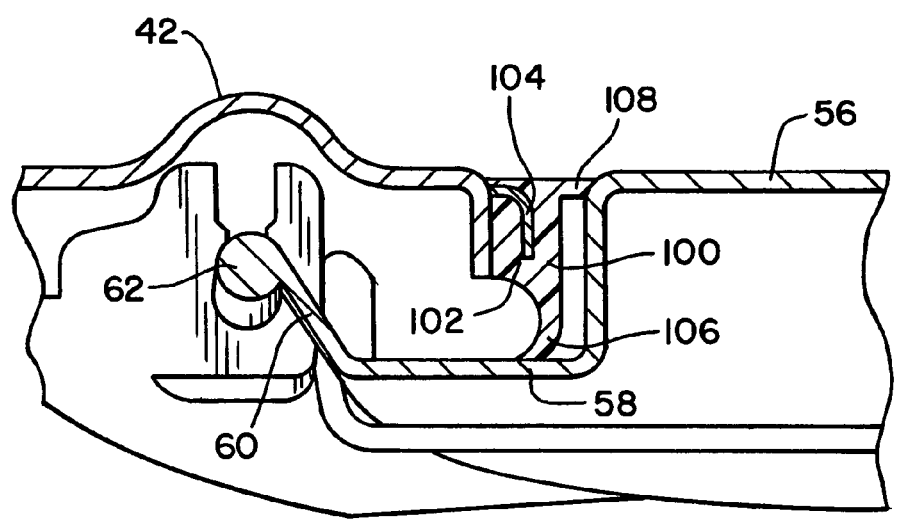
FIG. 7 is a cross-sectional view of the seal in the present valve assembly.

In the exemplary embodiment of FIG. 7, a seal 100 is functionally disposed between inlet 24 and flapper door 50. Seal 100 is a rubber-like annular body, which may be synthetic, and defines an annular groove 102. Inlet 24 has an inwardly extending lip 104. Seal 100 is attached to inlet 24 by pressing seal 100 such that lip 104 slides into annular groove 102. An annular tail element 106 of seal 100 sealingly engages flange 58 of flapper door 50 to establish the primary seal region between flapper door 50 and housing 30 at inlet 24. An annular tip 108 of seal 100 lies against the outer surface of central portion 56, thereby providing an initial outer seal as well, to keep water and contaminants from the primary seal are established by tail element 106.

In the embodiment thus far described, an inner surface 110 of housing 30 provides a guiding surface against which nozzle 26 can slide to be directed to outlet 28 during a refueling operation. However, independent structure may also be provided within housing 30 for guiding nozzle 26. FIGS. 8 and 9 illustrate a cone 120 provided as an extension from carrier 54. Cone 120 can be a substantially continuous insert, or can be provided as a structure of spaced substantially longitudinally extending ribbons 122 and an end ring 124 as shown in the drawings.

Figure 10:
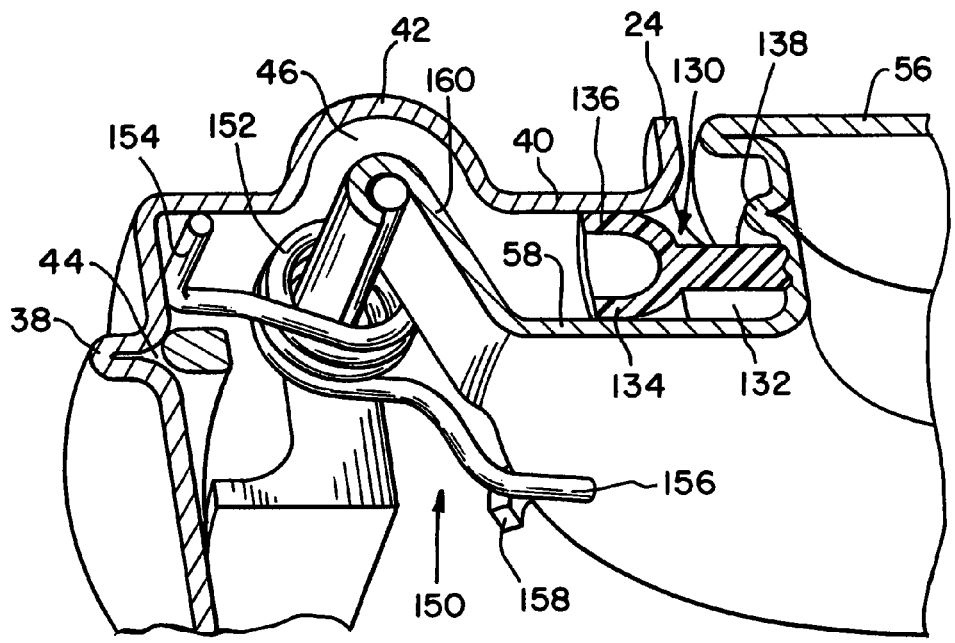
FIG. 10 is a cross-sectional view of another embodiment of a seal for the present invention.
Figure 11:
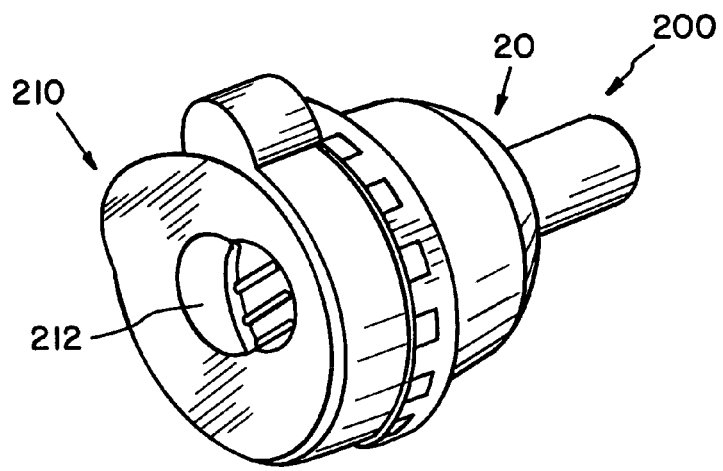
FIG. 11 is a perspective view of the shut-off valve assembly with an outer closure or cover assembly attached thereto in a capless refueling system.
Figure 12:
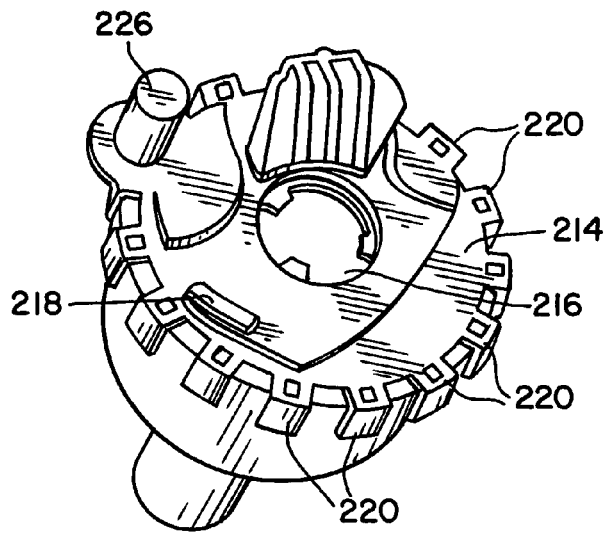
FIG. 12 is a perspective view of a first step of the final assembly for the capless refueling system of the present invention.

FIG. 10 illustrates an alternative embodiment of a seal element 130 that is fastened to flapper door 50 rather than to housing 30. Seal 103 is substantially Y-shaped, having a central trunk 132 and oppositely directed branches 134 extending therefrom. Seal 130 is provided about the outer periphery of central portion 56 of flapper door 50, which may include an annular ridge 138 to define an area between ridge 138 and flange 58 for receiving seal 130. Branches 134, 136 establish a seal against flange 58 and an inner surface of end plate 40 adjacent inlet 24 when flapper door 50 is held in a closed position.

FIG. 10 also illustrates an alternate embodiment of a biasing element 150. A single spring portion 152 has an arm 154 in contact with end plate 40 and a leg 156 in contact with flange 58. Flange 58 has a projection 158 for holding leg 156 in proper position against flange 58. A flapper door hinge arm 160 defines a hooked end 162 rotatably engaged on a pin 164 held in housing 30.

In use of primary fuel shut-off valve assembly 20, force is exerted against flapper door 50 as nozzle 26 is pushed thereagainst. The force from biasing element 52 is overcome and flapper door 50 pivots open, allowing full entrance of nozzle 26. When refueling has been completed, nozzle 26 is extracted, and biasing element 52 causes flapper door 50 to pivot closed. Sufficient force is exerted from biasing element 52 to create an effective seal between flapper door 50 and housing 30 via seal 100 or seal element 130. Since housing 30 is a seamless, contiguous body, no other potential path for leakage is present.

The force from biasing element 52 supplied to facilitate pressure equalization between the pressure within the fuel tank and thus housing 30 and ambient pressure. As fuel is removed from the fuel tank, a slight under pressure can exist, less than ambient pressure. The pressure differential experienced on opposite sides of flapper door 50 causes a slight and brief movement of flapper door 50. This controlled "leakage" is directional, from ambient to the interior of housing 30, allowing equalization of pressures. As soon and so long as the pressure differential is insufficient to overcome the force from biasing element 52, and effective seal is provided.

Figure 18:
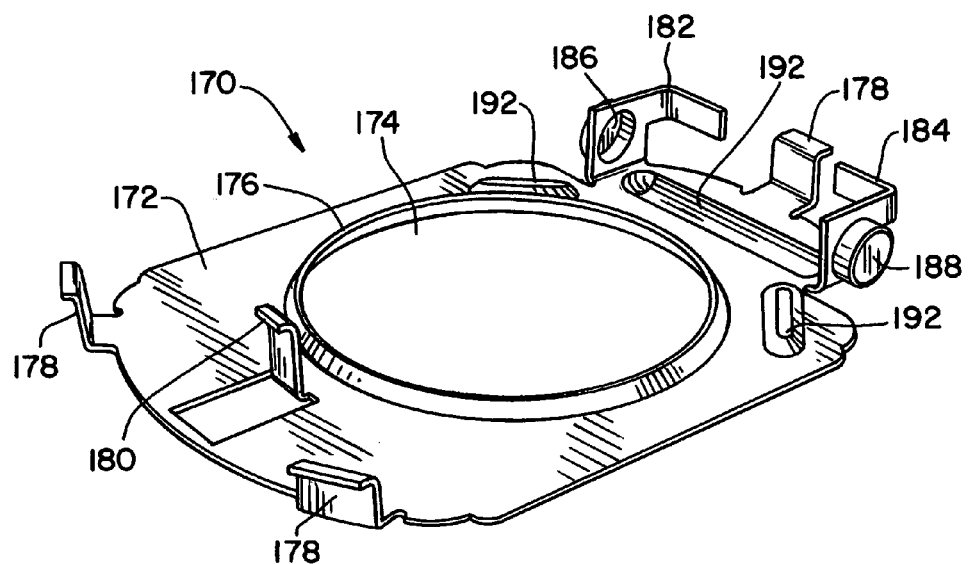
FIG. 18 is a perspective view of a second embodiment for a carrier used in the valve assembly of the present invention.
Figure 19:
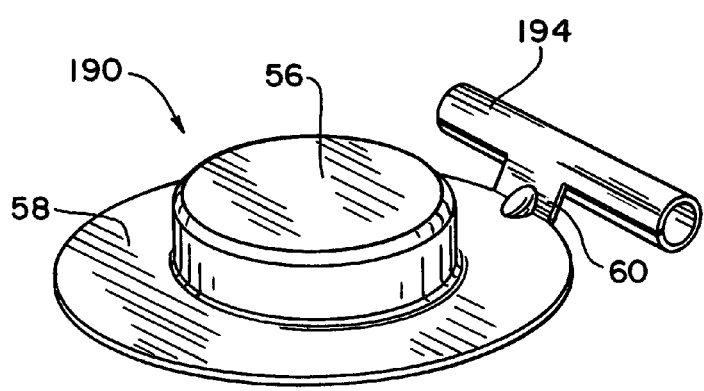
FIG. 19 is a perspective view of a second embodiment for the valve door of the present invention.

FIG. 18 illustrates a carrier second embodiment 170. Carrier 170 has a plate-like body 172 that can be made of metal advantageously and defines a circular opening 174. An edge 176 of body 172 defining opening 172 can be angled to hold or engage a seal (not shown). Legs 178 from body 172 are provided about the perimeter of body 172 and are shaped, sized and configured to be received in channel 44 for securing carrier 170 within housing 30. In the exemplary embodiment of FIG. 18, three legs 178 are shown. Body 172 further defines a stop 180, which may be formed from a bent, cutout section of body 172, as shown. Opposed, spaced arms 182, 184 define cup-like cavities 186, 188, respectively, for pivotally holding a flapper door 190 (FIG. 19). Dimples 192 in various shapes, sizes and locations can be provided to strengthen body 172, as those skilled in the art will understand readily. Three dimples 192 are shown but more or fewer than three dimples 192 can be used.

Flapper door 190 (FIG. 19) is hat-like in shape similar to flapper door 50. Thus, flapper door 190 also includes a cupped central portion 56 for projecting through opening 174 and inlet 24 and a peripheral flange 58 about central portion 56. Near the outer edge of flange 58, a hinge arm 60 and a rolled pin hinge element 194 are provided, with pin element 194 transverse to arm 60 at the distal end of arm 60. Pin element 194 is sufficiently long to extend between and be received rotatably in cup-like cavities 186, 188.

In a fully assembled capless refueling system 200 (FIG. 11), primary fuel shut-off valve assembly 20 is connected to a cover assembly 210 having a slidable puck 212 therein which is slid out of the way upon insertion of nozzle 26. FIGS. 11-17 illustrate the manner in which capless refueling system 200 is assembled. In the exemplary embodiment shown, a base 214 is provided between cover assembly 210 and primary fuel shut-off valve assembly 20. Base 214 is a substantially plate-like structure having an aperture 216 substantially centrally located therein to align with inlet 24 of primary fuel shut-off valve assembly 20. A bulge 218 in base 214 is sized and shaped to engulf enlargement 42 for accurately positioning base 214 relative to primary fuel shut-off valve assembly 20. Snap tabs 220 are provided at the periphery of base 214 and provide a snap-fit type engagement with ring 38 on housing 30. For clarity, some but not all snap tabs 220 are designated with a reference numeral in the drawings. With enlargement 42 positioned within bulge 218 (FIG. 14), and snap-tabs 220 engaged over ring 38, base 214 is securely and accurately positioned with respect to primary fuel shut-off valve assembly 20.

Figure 13:
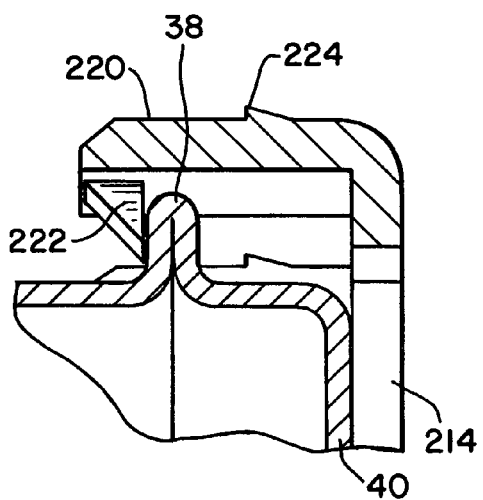
FIG. 13 is a fragmentary cross-sectional view of the assembly shown in FIG. 12.
Figure 14:
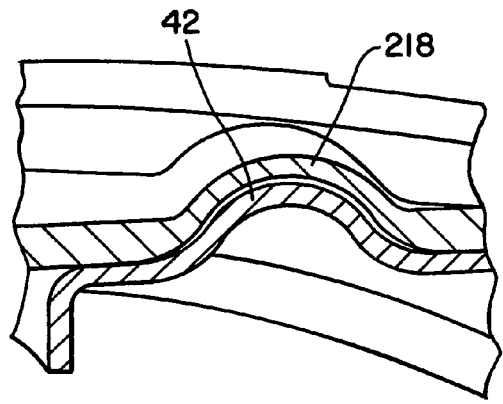
FIG. 14 is a cross-sectional view of the partial assembly shown in FIG. 12, illustrating the structure by which the parts are keyed one to another for proper final orientation.
Figure 15:
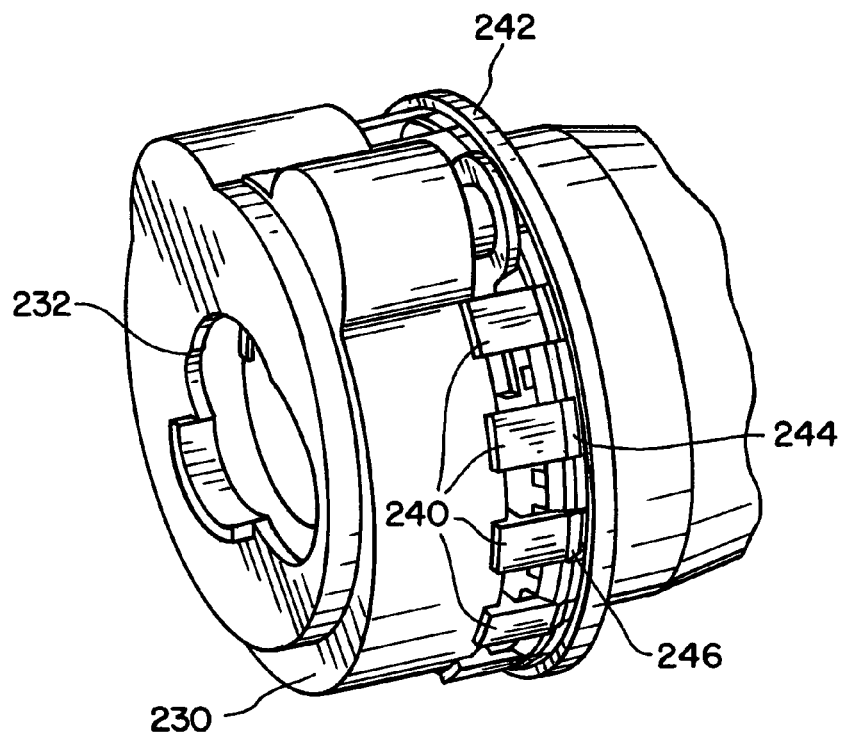
FIG. 15 is a perspective view of the final stages of assembly for the shut-off valve assembly and cover in the capless refueling system.
Figure 16:
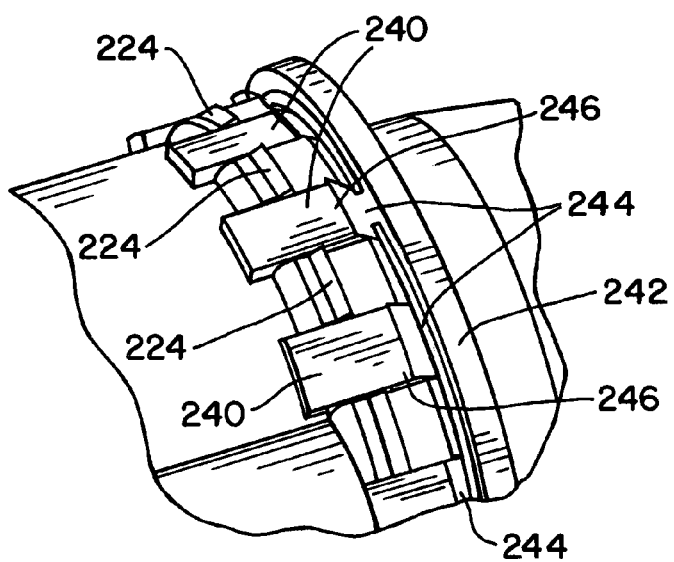
FIG. 16 is a fragmentary view of the assembly shown in FIG. 15.
Figure 17:
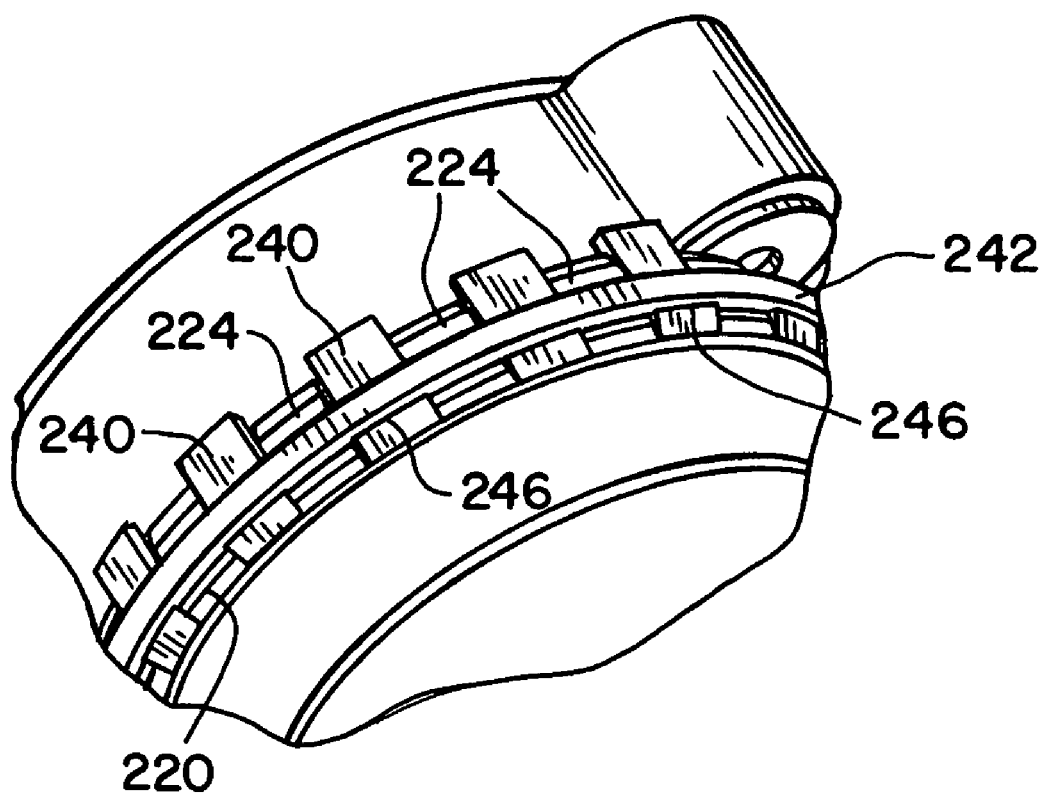
FIG. 17 is a fragmentary perspective view of the final assembly.

One snap tab 220 is illustrated in enlarged cross-sectional view in FIG. 13. Snap tab 220 includes an angularly downwardly depending catch 222 at the distal end of snap tab 220. The angular leading face on catch 222 forces snap tab 220 to deflect upwardly as base 214 is pushed over ring 38. Once snap tab 220 and particularly catch 222 thereof is passed ring 38, snap tab 220 returns to the non-deflected position and catch 222 restricts base 214 from being pulled away from primary fuel shut-off valve assembly 20. The outer surface of snap tab 220 has an outwardly directed stay 224 thereon, the purpose of which will be described hereinafter.

Base 214 further includes a post 226 for rotatably receiving an arm of the pendulum-like puck 212. A spring or other biasing means is associated with puck 212 to urge it towards a closed position. The internal structures of cover assembly 210 and puck 212 are not part of the present invention, need not be described for a complete understanding of the present invention and will not be described in further detail herein.

Cover assembly 210 also includes an outer cover 230, which is a cup-like structure having a substantially axially oriented opening 232 to align with aperture 216 and inlet 24. Puck 212 operates within cover 230 to open or close opening 232 when a nozzle 26 is inserted therein or removed therefrom.

A plurality of cover tabs 240 extend outwardly from cup-like cover 230 and are configured and arranged to substantially interdigitate with snap tabs 220 of base 214. A ring 242 is connected to the ends of cover tabs 240 by frangible links 244. Cover tab stays 246 are provided on the outer or distal end portions of cover tabs 240. During assembly, cover 230 is slid over the internal structures including puck 212 and along the outer edge of base 214, with cover tabs 240 interdigitating with snap tabs 220. When cover 230 is in the fully inserted position, frangible links 244 are fractured such that ring 242 is loose. Ring 242 is then slid over cover tabs 240 which are deflected inwardly. Ring 242 is slid over cover tabs 240 until it abuts stays 224 on snap tabs 220. Ring 242 will have passed completely over cover tab stops 246 which causes the inward deflection of cover tabs 240. Once cover tab stops 246 have passed completely through ring 242, cover tabs 240 will return to the non-deflected position. At that point, ring 242 is secured between cover tab stops 246 and stays 224. In this manner, cover 230 is securely attached to base 214. If servicing is required, ring 242 is broken to free cover 230 from base 214. A separate, independent ring can be used of similar size and shape to ring 242 for re-securing cover 230 on base 214. Other types of hose clamps and the like also can be used. In the event of a crash, cover assembly 210 can break away from valve assembly 20, which will remain closed and sealed to prevent fuel spillage.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fuel shut-off valve assembly comprising:
    a one-piece housing defining an outlet for attachment to a fuel system and an inlet defining an opening for receiving a fuel filler nozzle therein;
    a flapper door in said housing movable with respect to said housing for opening and closing said inlet;
    a seal disposed between said flapper door and said inlet;
    biasing means urging said door to a closed position compressing said seal;
    nozzle guiding structure between said outlet and said inlet for directing a nozzle end inserted through said inlet toward said outlet; and
    a cover assembly connected to said housing and covering said inlet, said cover assembly including an outer opening, said cover assembly including a base connected to said housing and an outer cover connected to said base, said base and said cover each including spaced tabs configured and arranged for interdigitation with the tabs of the other, said tabs of said base having catches projecting inward, and said housing having an outward extending ring engaged by said catches, said cover assembly including a retainer ring disposed around said interdigitated tabs of said outer cover and of said base.

2. The fuel shut-off valve assembly of claim 1, wherein said housing is a seamless, one-piece metal housing, said housing including a substantially closed end plate in which said inlet is defined and said end plate being substantially transverse to an axis extending through said inlet and said outlet, said housing being seamless between said inlet and said outlet, said flapper door being in said end plate in said housing, said assembly including a carrier frame having said door pivotally mounted thereto, said frame being fixedly secured in said housing, and said nozzle guiding structure being a non-cylindrical nozzle guiding structure.

3. The fuel shut-off valve assembly of claim 2, said seal being connected to said flapper door.

4. The fuel shut-off valve assembly of claim 2, said seal being connected to said inlet.

5. The fuel shut-off valve assembly of claim 4, said inlet having an inwardly projecting lip defining said opening and said seal having a channel for engaging said lip.

6. The fuel shut-off valve assembly of claim 5, said biasing means applying force against said flapper door substantially at the center thereof.

7. The fuel shut-off valve assembly of claim 5, said biasing means being a double torsion spring.

8. The fuel shut-off valve assembly of claim 2, said flapper door having a central portion for extending into said inlet and an annular flange around said central portion, and said seal having sealing regions along both said central portion and said flange.

9. The fuel shut-off valve assembly of claim 2, said biasing means being an electrically conductive spring in electrically conductive contact with said flapper door and said housing.

10. The fuel shut-off valve assembly of claim 2, said nozzle guiding structure including inner wall surfaces of said housing between said inlet and said outlet.

11. The fuel shut-off valve assembly of claim 2, said nozzle guiding structure including a cone disposed in said housing.

12. The fuel shut-off valve assembly of claim 11, said flapper door being pivotally connected to said cone.

13. The fuel shut-off valve assembly of claim 2, said flapper door having a central portion extending into said inlet and an annular flange around said central portion; and said seal having a trunk sealing engaged with said central portion and branches extend from said trunk and sealingly engaging said flange and said housing.

14. The fuel shut-off valve assembly of claim 1, said tabs of said base and said tabs of said cover having stays projecting outwardly therefrom, and said ring disposed between said stays on said tabs of said base and said stays on said tabs of said cover.

15. The fuel shut-off valve assembly of claim 1, wherein said housing is a seamless, one-piece metal housing, said housing including a substantially closed end plate in which said inlet is defined and said end plate being substantially transverse to an axis extending through said inlet and said outlet, said housing being seamless between said inlet and said outlet, said flapper door being in said end plate in said housing, said seal being connected to one of said flapper door and said inlet, and said nozzle guiding structure being a non-cylindrical nozzle guiding structure.

* * * * *